UNITED STATES PATENT OFFICE.

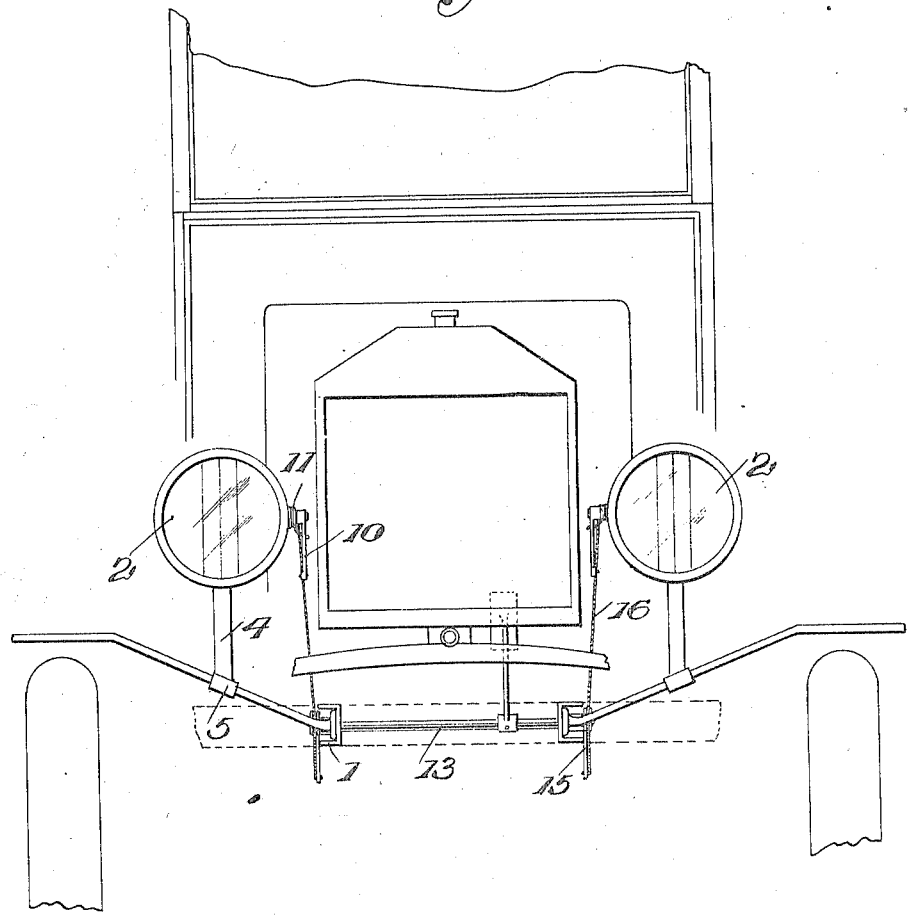

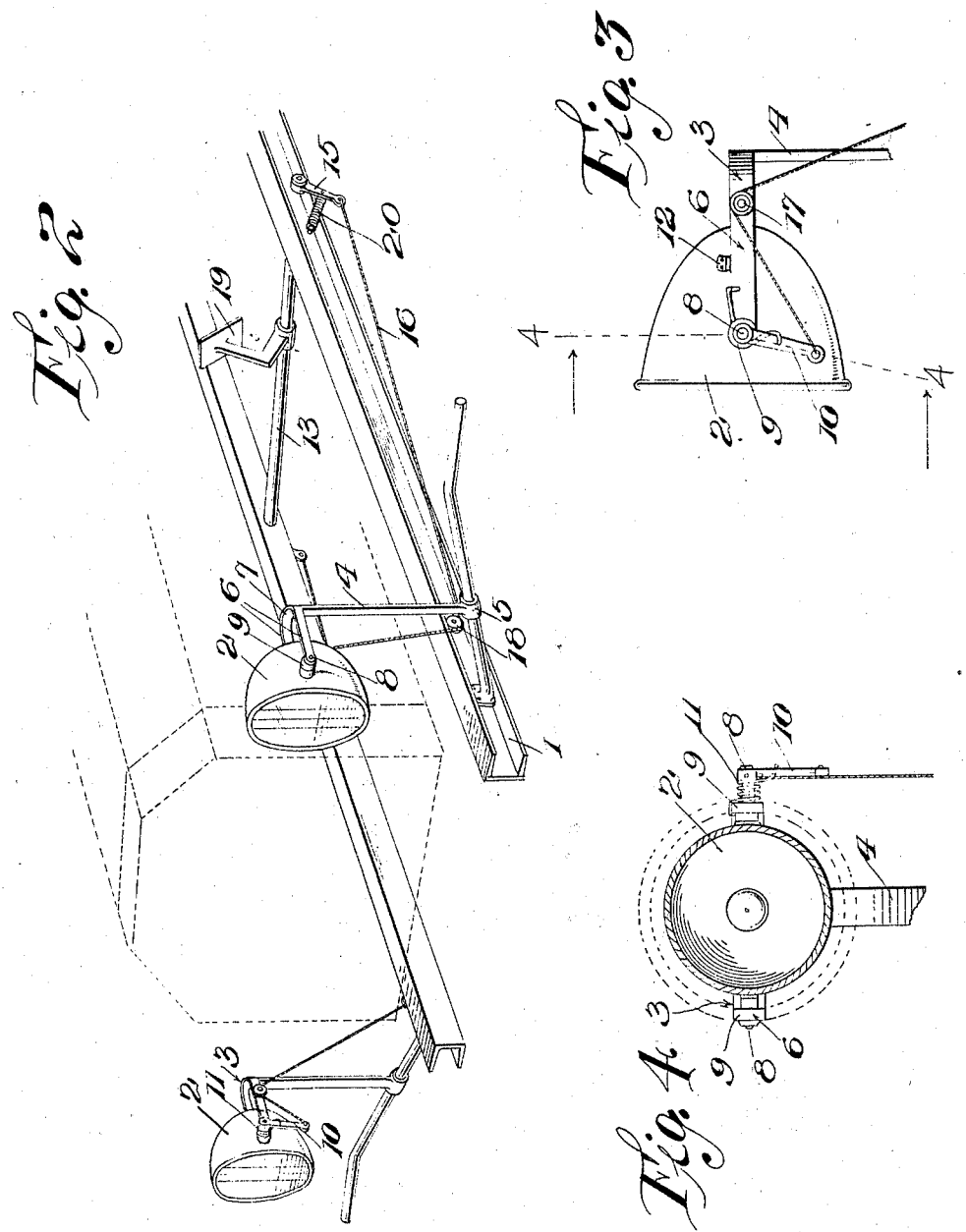

CHARLES A. SANDSTEDT, OF MANISTEE, MICHIGAN.

AUTOMOBILE-HEADLIGHT.

1,307,758.

Specification of Letters Patent. Patented June 24, 1919.

Application filed July 26, 1918. Serial No. 246,884.

*To all whom it may concern:*

Be it known that I, CHARLES A. SANDSTEDT, a citizen of the United States, residing at Manistee, in the county of Manistee and State of Michigan, have invented certain new and useful Improvements in Automobile-Headlights, of which the following is a specification.

This invention relates to automobile headlights and has as its object to provide a dirigible headlight and a novel means for actuating the same so that the rays of light may be directed at any desired angle downwardly toward the road surface so that when approaching another automobile, the light rays may be so directed as not to blind the driver of the oncoming machine, and also so that in driving over a particularly rough road, a better and clearer view may be had of the road than is possible where the lights constantly assume a horizontal or substantially horizontal position.

One of the primary objects of the present invention is to provide headlight actuating means of the class above described of such construction as to adapt it to be readily installed upon any ordinary type of automobile without requiring any material alteration in the frame or body of the vehicle.

A further object of the invention is to so construct the actuating means for the headlight that no considerable movement of the actuating pedal will be required in order to tilt the headlight through a long arc.

In the accompanying drawings:

Figure 1 is a front elevation of the mechanism mounted upon an automobile;

Fig. 2 is a perspective view of the mechanism, the view also illustrating the side members of the chassis frame;

Fig. 3 is a side elevation of one of the headlights, its supporting bracket and a portion of the actuating mechanism;

Fig. 4 is a vertical section on the line 4—4 of Fig. 3.

In the drawings, the numeral 1 indicates in general the side bars of the chassis frame of an automobile, and the numeral 2 indicates the headlights which are as usual located at the opposite sides of the front of the hood of the machine. The headlights are each supported in a suitable bracket indicated in general by the numeral 3 and comprising a standard 4 provided at its lower end with an attaching collar 5 which is secured to the fender bracket of the respective frame bar 1, the standard 4 extending vertically. At its upper end, the standard 4 is formed with a yoke 6, the arms of which are directed horizontally forwardly and curved in an outward direction as indicated by the numeral 7, the said arms 7 being of such conformation as to receive between them the respective headlight 2. Trunnions 8 upon the opposite side of the headlight 2 are fitted into bearing openings 9 in the extremities of the portions 7 of the arms of the yoke and in this manner the headlight is supported for tilting movement in a vertical plane and may therefore be moved from the horizontal position shown in Figs. 2 and 3 of the drawings, to a downwardly inclined position at any desired angle. Of course, when the headlights are in the horizontal position shown in Figs. 2 and 3, the light rays will be projected therefrom in the usual manner, but when the headlights are tilted in a downward direction, the light rays will be thrown in a corresponding direction and more directly on to the road surface so that the driver of an oncoming machine will be relieved of the blinding glare of the headlights and at the same time the full benefit of the lights will be obtained in illuminating the road surface in advance of the automobile.

In order that the headlights may be normally maintained in a true horizontal position, an arm 10 is secured to one of the trunnions of each headlight and hangs rigidly therefrom, being inclined a little forward when the headlight glass is vertical. A spring 11 is coiled about said trunnion of each head light and one arm of each spring is engaged over the upper edge of the adjacent yoke arm 7 of the respective bracket 3, and the other arm of each spring is engaged behind the rear edge of the said arm 10. In order to limit the tilting or swinging movement of the head light under the influence of the spring, however, an abutment lug 12 is secured to one or both sides of each headlight casing rearwardly of and slightly above the trunnion or pivot 8, and this lug engages the portion 7 of the respective arm 6 of the bracket yoke so that the spring 11 cannot swing the headlight to direct its rays above the horizontal or normal line of reflection of the rays.

The means provided for swinging the headlights in a downward direction is designed to actuate the lights simultaneously, and this means includes a shaft 13 which is mounted for rocking movement in suitable bearings secured upon the side bars 1 of the chassis frame. Short operating crank arms 15 are fixed upon the ends of the shaft 13, and flexible cables 16 are connected at one end to the crank arms and at their other ends to the respective arms 10. The cables are led upwardly and rearwardly from the respective arms 10 and over guide pulleys 17 on the respective yoke arms 7, and from the said pulleys 17, the cables are led downwardly and around pulleys 18 upon the bars 1 and thence to the arms 15.

The numeral 19 indicates a pedal which is secured to the shaft 13 and which extends above the floor of the machine in convenient reach of the driver. A spring 20 is connected at one end to one of the crank arms 15 and at its other end to the adjacent side member of the chassis frame, and the said spring normally exerts a pull in a forward direction upon the said arm 15, it being understood that pressure exerted in a forward direction against the pedal 19 will swing the arm 15 rearwardly against the tension of the said spring 20, thus imparting rocking motion to the shaft 13 in a manner to swing or tilt the headlights in a downward direction. Of course, when the pedal is relieved of pressure, the springs 11 will automatically return the headlights to normal position and the spring 20 will assist in this return of the parts, the last mentioned spring serving also as a means directly acting upon the arm 15 to swing the pedal rearwardly under the conditions stated.

It will be observed from Fig. 3 that the operating cable rises from the lamp arm 10 at a sharp or acute angle thereto, and leads thence over the guide 17. This arrangement is purposely adopted, with the result that a slight pull on the cable is amplified into a considerable rotary movement of the headlight. If the pedal be depressed further, the headlight will be tilted further, but more slowly. As a result, the operator has but to touch the pedal in order to turn the headlight down out of the eyes of an approaching motorist, and thereafter he can depress the pedal additionally to a greater or less degree to apply the spot light to such portion of the roadway as he desires illuminated.

Having thus described the invention, what is claimed as new is:

In a device of the class described, a bracket having a horizontal yoke, a headlight having trunnions journaled in the yoke arms and an arm depending rigidly from one trunnion and inclined slightly forward when the headlight glass stands vertically, yieldable means turning the headlight normally upward, a stop checking this movement when the glass reaches a vertical position, a cable leading from the lower end of said arm rearwardly, and a cable guide located on one arm of the yoke in such position that the cable between the guide and lamp arm stands at an acute angle to the length of the last-named arm, for the purpose set forth.

In testimony whereof I affix my signature.

CHARLES A. SANDSTEDT. [L. S.]